(12) United States Patent
Thomas et al.

(10) Patent No.: US 10,552,384 B2
(45) Date of Patent: Feb. 4, 2020

(54) SYNCHRONIZING MEDIA FILES AVAILABLE FROM MULTIPLE SOURCES

(75) Inventors: Edward Eric Thomas, Seattle, WA (US); Grant McSheffrey, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 492 days.

(21) Appl. No.: 12/177,116

(22) Filed: Jul. 21, 2008

(65) Prior Publication Data

US 2009/0282050 A1 Nov. 12, 2009

Related U.S. Application Data

(60) Provisional application No. 61/127,796, filed on May 14, 2008, provisional application No. 61/127,813, filed on May 14, 2008, provisional application No. 61/052,640, filed on May 12, 2008, provisional application No. 61/052,633, filed on May 12, 2008.

(51) Int. Cl.
| | | |
|---|---|---|
| G06F 17/30 | (2006.01) | |
| G06F 7/00 | (2006.01) | |
| G06F 16/182 | (2019.01) | |

(52) U.S. Cl.
CPC .................................. G06F 16/182 (2019.01)

(58) Field of Classification Search
CPC ......... G06F 17/30575; G06F 17/30584; G06F 16/273; G06F 16/275; G06F 16/278; G06F 16/182
USPC .................... 707/610, 617, 999.001–999.005
See application file for complete search history.

(56) References Cited

U.S. PATENT DOCUMENTS

| | | | |
|---|---|---|---|
| 5,713,013 A | 1/1998 | Black | |
| 6,072,479 A | 6/2000 | Ogawa | |
| 6,295,541 B1 * | 9/2001 | Bodnar et al. | 707/999.003 |
| 6,345,256 B1 | 2/2002 | Milsted et al. | |
| 6,366,296 B1 | 4/2002 | Boreczky et al. | |
| 6,549,922 B1 | 4/2003 | Srivastava et al. | |
| 6,744,815 B1 * | 6/2004 | Sackstein et al. | 375/240 |
| 7,024,430 B1 * | 4/2006 | Ingraham | G06F 16/27 |
| 7,065,521 B2 | 6/2006 | Li et al. | |
| 7,260,312 B2 | 8/2007 | Srinivasan et al. | |
| 7,346,687 B2 | 3/2008 | Lipscomb et al. | |
| 7,680,849 B2 * | 3/2010 | Heller et al. | 707/621 |
| 8,005,789 B2 | 8/2011 | Yoon et al. | |
| 2002/0099737 A1 | 7/2002 | Porter et al. | |
| 2002/0103919 A1 * | 8/2002 | Hannaway | 709/231 |
| 2002/0124099 A1 | 9/2002 | Srinivasan et al. | |

(Continued)

FOREIGN PATENT DOCUMENTS

| | | |
|---|---|---|
| EP | 1227396 A1 | 7/2002 |
| EP | 6549922 | 4/2003 |

(Continued)

OTHER PUBLICATIONS

"European Applicaton Serial No. 09160035.3, Search Report dated Oct. 12, 2009", 9 pgs.

(Continued)

*Primary Examiner* — Kannan Shanmugasundaram
(74) *Attorney, Agent, or Firm* — Fish & Richardson P.C.

(57) ABSTRACT

Apparatus and methods for synchronizing media files available from multiple sources provide a mechanism to enhance user interaction with multimedia devices. Additional apparatus, systems, and methods are disclosed.

15 Claims, 12 Drawing Sheets

(56) References Cited

U.S. PATENT DOCUMENTS

| | | |
|---|---|---|
| 2002/0147850 A1 | 10/2002 | Richards et al. |
| 2002/0148343 A1 | 10/2002 | Gross |
| 2003/0167318 A1 | 9/2003 | Robbin et al. |
| 2003/0236695 A1 | 12/2003 | Litwin, Jr. |
| 2004/0126038 A1 | 1/2004 | Aublant et al. |
| 2004/0034650 A1 | 2/2004 | Springer et al. |
| 2004/0103174 A1 | 5/2004 | Balducci et al. |
| 2004/0205638 A1 | 10/2004 | Thomas |
| 2004/0267825 A1* | 12/2004 | Novak et al. ............... 707/200 |
| 2005/0010616 A1 | 1/2005 | Burks et al. |
| 2005/0015389 A1 | 1/2005 | Novak et al. |
| 2005/0015551 A1 | 1/2005 | Eames et al. |
| 2005/0021470 A1 | 1/2005 | Martin et al. |
| 2005/0098023 A1 | 5/2005 | Toivonen et al. |
| 2005/0131959 A1 | 6/2005 | Thorman et al. |
| 2005/0165752 A1* | 7/2005 | Mathew et al. ............... 707/3 |
| 2005/0210119 A1 | 9/2005 | Kumar |
| 2005/0216855 A1 | 9/2005 | Kopra et al. |
| 2006/0004699 A1 | 1/2006 | Lehikoinen et al. |
| 2006/0020589 A1 | 1/2006 | Wu et al. |
| 2006/0062095 A1* | 3/2006 | Volk ............... G11B 7/1205 369/30.19 |
| 2006/0069998 A1 | 3/2006 | Artman et al. |
| 2006/0083207 A1* | 4/2006 | Karimi ............... G06F 11/1464 370/338 |
| 2006/0100978 A1 | 5/2006 | Heller et al. |
| 2006/0163358 A1 | 7/2006 | Biderman |
| 2006/0188215 A1 | 8/2006 | Matsutani |
| 2006/0204211 A1 | 9/2006 | Hidehito et al. |
| 2006/0242259 A1* | 10/2006 | Vallabh et al. ............... 709/217 |
| 2007/0005653 A1 | 1/2007 | Marsh |
| 2007/0038941 A1 | 2/2007 | Wysocki et al. |
| 2007/0043765 A1 | 2/2007 | Chan et al. |
| 2007/0050366 A1 | 3/2007 | Bugir et al. |
| 2007/0061409 A1 | 3/2007 | Rydenhag |
| 2007/0067597 A1 | 3/2007 | Chen et al. |
| 2007/0083651 A1 | 4/2007 | Ishida |
| 2007/0112844 A1 | 5/2007 | Tribble et al. |
| 2007/0112861 A1 | 5/2007 | Buczek et al. |
| 2007/0180127 A1 | 8/2007 | Vuori |
| 2007/0198602 A1 | 8/2007 | Ngo et al. |
| 2007/0233702 A1 | 10/2007 | Ohkita et al. |
| 2007/0271310 A1 | 11/2007 | Han et al. |
| 2008/0052380 A1 | 2/2008 | Morita et al. |
| 2008/0086494 A1* | 4/2008 | Heller ............... H04L 67/1095 |
| 2008/0109449 A1 | 8/2008 | Chun et al. |
| 2008/0194276 A1 | 8/2008 | Lin et al. |
| 2009/0150569 A1 | 6/2009 | Kumar et al. |
| 2009/0282020 A1 | 11/2009 | McSheffrey et al. |
| 2009/0282050 A1 | 11/2009 | Thomas |
| 2009/0282057 A1 | 11/2009 | Thomas |
| 2009/0282077 A1 | 11/2009 | Thomas |
| 2009/0282078 A1 | 11/2009 | Thomas et al. |
| 2009/0282088 A1 | 11/2009 | Thomas et al. |

FOREIGN PATENT DOCUMENTS

| | | |
|---|---|---|
| EP | 1632945 | 3/2006 |
| EP | 1708101 | 10/2006 |
| EP | 20070233702 A1 | 10/2007 |
| EP | 1923797 A1 | 5/2008 |
| EP | 1903450 A3 | 12/2008 |
| JP | H0962556 | 3/1997 |
| JP | H1115756 | 1/1999 |
| JP | 2001186459 | 12/1999 |
| JP | 2000-324324 | 11/2000 |
| JP | 2001-186459 | 6/2001 |
| JP | 2002041823 | 2/2002 |
| JP | 2002-182658 | 6/2002 |
| JP | 2002230316 | 8/2002 |
| JP | 2003186785 | 7/2003 |
| JP | 2005-044097 | 2/2005 |
| JP | 2006065813 | 3/2006 |
| JP | 2006080965 | 3/2006 |
| JP | 2007110199 | 4/2007 |
| JP | 2007-156804 | 6/2007 |
| JP | 2007300511 | 11/2007 |
| JP | 2008-052520 | 3/2008 |
| JP | 200852820 | 3/2008 |
| JP | 2006252478 | 4/2008 |
| JP | 2008583843 | 11/2008 |
| WO | WO-00063801 A1 | 10/2000 |
| WO | WO-02075539 A2 | 9/2002 |
| WO | WO-03036541 A1 | 5/2003 |
| WO | WO-2003036541 A1 | 5/2003 |
| WO | 2003036541 | 10/2003 |
| WO | WO 2005/096176 * | 10/2005 ............. G06F 17/30 |
| WO | WO-05116868 A1 | 12/2005 |
| WO | WO-2005116868 A1 | 12/2005 |
| WO | WO-2006116368 A2 | 2/2006 |
| WO | 2006/047578 | 5/2006 |
| WO | 2006/093839 | 9/2006 |
| WO | WO-07145854 A1 | 12/2007 |
| WO | WO-08008448 A2 | 1/2008 |

OTHER PUBLICATIONS

"European Application Serial No. 09160035.3, Partial European Search Report dated Jul. 24, 2009".

Perry, C, et al., "Wayfinder: Navigating and Sharing Infomation in a Decentralized World", *Lecture Notes in Computer Science, Databases, Information Systems, and Peer-to-Peer Computing*, vol. 3367/2005, (2005), 200-214.

Sinitsyn, et al., "A Synchronization Framework for personal mobile server", *Proceedings of the Second IEEE Annual Conference on Pervasive Computing and Communications Workshops (PERCOMW'04)*, Mar. 14, 2004, 208-212.

Vetro, A, et al., "Media Conversions to Support Mobile Users", *Electrical and Computer Engineering, 2001. Canadian Conference on May 13-16, 2001.*, (May 13, 2001), 607-612.

"U.S. Appl. No. 12/177,101 Non-Final Office Action dated Nov. 10, 2010", 13 pgs.

"U.S. Appl. No. 12/177,101, Response filed Feb. 10, 2011 to Non Final Office Action dated Nov. 10, 2010", 13 pgs.

"U.S. Appl. No. 12/177,105 Non-Final Office Action dated Oct. 28, 2010", 10 pgs.

"U.S. Appl. No. 12/177,105, Response filed Jan. 28, 2011 to Non Final Office Action dated Oct. 28, 2010", 11 pgs.

"U.S. Appl. No. 12/177,112 Non-Final Office Action dated Oct. 29, 2010", 18 pgs.

"U.S. Appl. No. 12/177,118 , Response filed Feb. 15, 2011 to Non Final Office Action dated Nov. 15, 2010", 14 pgs.

"U.S. Appl. No. 12/177,118, Non Final Office Action dated Nov. 15, 2010", 12 pgs.

"Australian Application Serial No. 2009201882, Australian Examiner Report dated Apr. 9, 2010", 3 pgs.

"European Application Serial No. 09160035.3, Office Action dated Jun. 7, 2010", 1 pg.

"European Application Serial No. 09160035.3, Office Action Response Filed: Dec. 16, 2010", 6 pgs.

Sinitsyn, A, "A synchronization framework for personal mobile servers", Proceedings of the Second IEEE Annual Conference on Pervasive Computing and Communications Workshops, (Mar. 14, 2004), 208-212.

Hiroshi et al., "Content Protection in Content Dilvery for Adaptive Content," IEICE ETransaction on Communications (Japanese Edition), Mar. 1, 2006, J89(3):324-226.

Mohan et al., "Adapting Multimedia Internet ocntent for Universal Access," IEEE Transactions on Multimedia, Mar. 1999, 1(1):104-114.

Perry et al., "Wayfinder: Navigating and Sharing Information in a Decentralized World," Databases, Information and Systems, Peer-to-Peer Computing, Lecture Notes in Computer Science, Aug. 29, 2004, 367:200-214.

Rocha et al., "Middleware for multi-client and multi-server mobile applications," Second International Symposium on Wireless Pervasive Computing, Feb. 5-7, 2007.

(56) References Cited

OTHER PUBLICATIONS

Satyanarayanan et al., "Coda: A Highly Available File System for a Distributed Workstation Environment," IEE Transaction on Computers, Apr. 1990, 39(4):447-459.
Vetro and Sun, "Media Conversions to Support mobile Users," Electrical and Computer Engineering, May 13, 2001, 607-612.
Wang and Karmouch, "A Multimedia File Structure for Continuous and discrete Media," Electrical and Computer Engineering, Sep. 14-17, 1993, 2:644-647.
European Search Report in European Application No. 09155853.6, dated May 29, 2009, 5 pages.
European Search Report in European Application No. 09160028.8, dated Jul. 27, 2009, 7 pages.
European Search Report in European Application No. 09160035.3, dated Oct. 12, 2009, 9 pages.
Extended European Search Report in European Application No. 09155841.1, dated May 11, 2009, 6 pages.
Extended European Search Report in European Application No. 09155844.5, dated May 19, 2009, 5 pages.
Extended European Search Report in European Application No. 09160031.2, dated Jul. 17, 2009, 7 pages.
Japanese Office Action dated Jan. 7, 2014, in counterpart Application No. 2013-013104 (2 pages).
Decision on Appeal dated Mar. 26, 2014, by the Japanese Patent Office Board of Appeals in counterpart Application No. 2013-11277 (12 pages).
Ananth Devulapalli et al., "File Creation Strategies in a Distributed Metadata File System", 2007, IEEE, 10 pages.
Notice of Hearing issued in Indian Application No. 638/DEL/2009 on Jan. 5, 2017.
Communication Pursuant to Article 94(3) EPC issued in European Application No. 09160031.2 dated Jan. 30, 2017.
Communication Pursuant to Article 94(3) EPC issued in European Application No. 09160035.3 dated Feb. 22, 2017.
"A Primer to SyncML/OMA DS," (OMA-WP-SyncML_Primer-20070718-D), Draft, Open Mobile Alliance (OMA), San Diego, California, Jul. 18, 2007, pp. 1-27.
Office Action issued in Indian Application No. 717/DEL/2009 dated Sep. 28, 2016.
Communication Pursuant to Article 94(3) EPC issued in European Application No. 09155853.6 dated Nov. 30, 2016.
Communication Pursuant to Article 94(3) EPC issued in European Application No. 09155844.5 dated Nov. 30, 2016.
Summons to Attend Oral Proceedings issued in European Application No. 09155841.1 dated Jul. 11, 2017; 11 pages.
Summons to Attend Oral Proceedings issued in European Application No. 09155844.5 dated May 29, 2017.
Summons to Attend Oral Proceedings issued in European Application No. 09155853.6 dated Jun. 9, 2017.
Decision to Refuse Application issued in European Application No. 09155844.5 dated Nov. 20, 2017; 12 pages.
Decision to Refuse Application issued in European Application No. 09155853.6 dated Nov. 30, 2017; 12 pages.
Summons to Attend Oral Proceedings issued in European Application No. 09160035.3 dated Dec. 7, 2017; 10 pages.
Brief Communication issued in European Application No. 09155853.6 dated Nov. 6, 2017; 11 pages.
Summons to Attend Oral Proceedings Pursuant to Rule 115(1) EPC issued in European Application No. 09160031.2 on Nov. 13, 2017; 9 pages.
Communication Pursuant to Article 94(3) EPC issued in European Application No. 12163039.6 dated Mar. 6, 2018, 7 pages.
Decision to Refuse Application issued in European Application No. 09155841.1 on Jan. 10, 2018, 10 pages.
Examination Report issued in Indian Application No. 1087/CHE/2009 dated Dec. 10, 2018, 7 pages.
European Communication issued in European Application No. 09160035.3 dated Jun. 25, 2018, 15 pages.
Examination Report issued in Indian Application No. 1091/CHE/2009 dated Apr. 11, 2018, 6 pages.
Summons to Attend Oral Proceedings Pursuant to Rule 115(1) EPC issued in European Application No. 12163039.6 dated Feb. 12, 2019, 12 pages.
Notice of Hearing issued in Indian Application No. 637/DEL/2009 on Jun. 14, 2019, 2 pages.
Notice of Hearing issued in Indian Application No. 717/DEL/2009 on May 30, 2019, 5 pages (With English translation).
"U.S. Appl. No. 12/177,101, Final Office Action dated Apr. 26, 2011", 10 pgs.
"U.S. Appl. No. 12/177,105, Final Office Action dated Apr. 12, 2011", 9 pgs.
"U.S. Appl. No. 12/177,112, Response filed Mar. 28, 2011 to Non Final Office Action dated Oct. 29, 2010", 10 pgs.
"U.S. Appl. No. 12/177,118, Final Office Action dated Apr. 26, 2011", 10 pgs.
"Australian Application Serial No. 2009201879, Subsequent Examiner Report dated Apr. 15, 2011", 3 pgs.
"Australian Application Serial No. 2009201279, Examiner Report dated Mar. 8, 2011", 3 pgs.
"Australian Application Serial No. 2009201279, Response filed Feb. 17, 2011 to Examiner Report dated Dec. 24, 2010", 2 pgs.
"Australian Application Serial No. 2009201876, Response filed Feb. 17, 2011 to First Examiner Report dated Feb. 22, 2010", 3 pgs.
"European Application Serial No. 09155844.5, Extended European Search Report dated Aug. 27, 2009", 3 pgs.

\* cited by examiner

SYNCHRONIZING MEDIA FILES AVAILABLE FROM MULTIPLE SOURCES

RELATED APPLICATIONS

This application claims the benefit of priority under 35 U.S.C. 119(e) to U.S. Provisional Patent Application Ser. No. 61/127,796 filed 14 May 2008, to U.S. Provisional Patent Application Ser. No. 61/127,813 filed 14 May 2008, to U.S. Provisional Patent Application Ser. No. 61/052,640 filed 12 May 2008, and to U.S. Provisional Patent Application Ser. No. 61/052,633 filed 12 May 2008, which are incorporated herein by reference in their entirety.

BACKGROUND

Access to information is an important factor in the functioning of modern society. Improvements to the flow of information enhance one's ability to interact with others, to respond to changing needs, and to avail oneself of enjoyment from processing various media based information.

BRIEF DESCRIPTION OF THE DRAWINGS

Various example embodiments are further described with reference to the following accompanying drawings.

DETAILED DESCRIPTION

Certain specific details are set forth in the following description and figures to provide a thorough understanding of various embodiments. Those of ordinary skill in the relevant art will understand that they can practice other embodiments without one or more of the details described below. In addition, the various methods are described by reference to a sequence of operations in the following disclosure; however, the description as such is for providing a clear implementation of embodiments of the disclosure, and the particular sequence described should not be taken as required.

In general, it is contemplated that the various systems, methods, and computer readable media disclosed herein will be implemented within a system for transferring media content. Such a system may generally be described as a computer-implemented or a computerized system that includes "subsystems" for synchronizing media files available from multiple sources in the manner described below.

Figure 1:
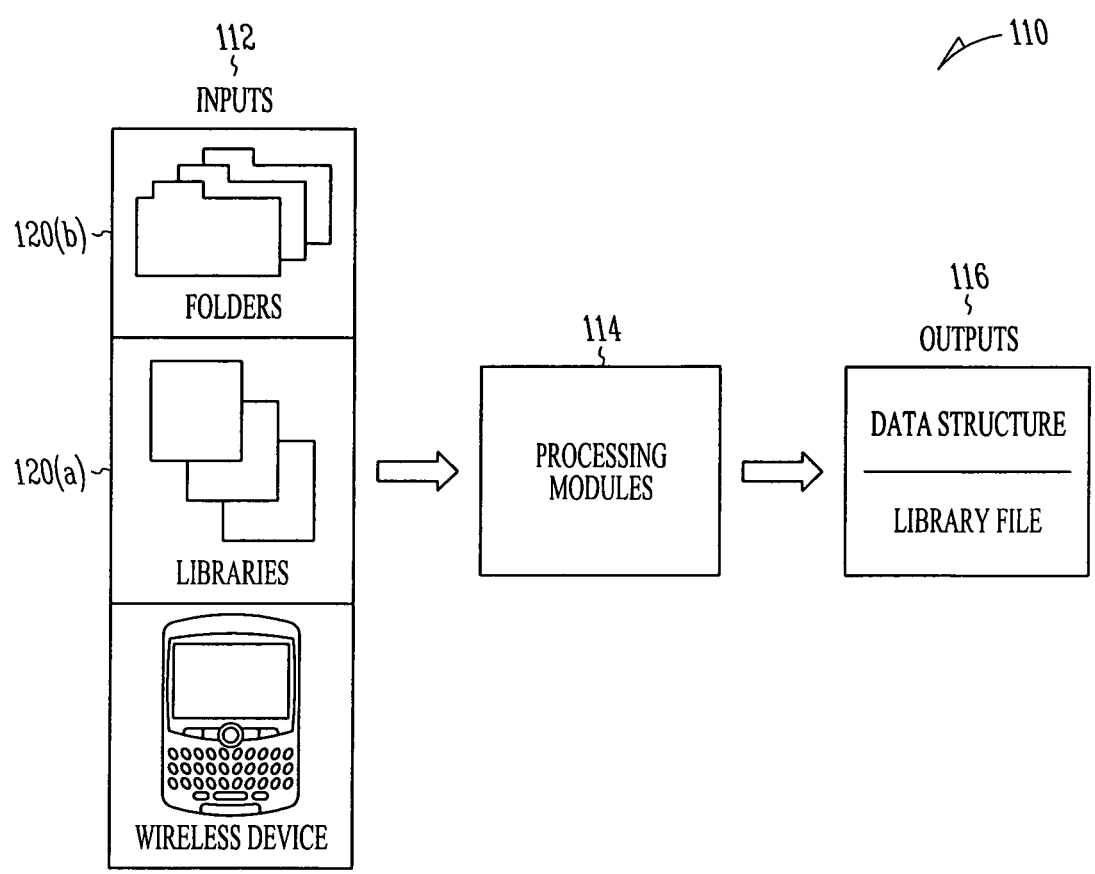
FIG. 1 is a functional block diagram of system for managing media content.

Operating Environment. FIG. 1 is a functional block diagram of a system for managing media content. The system for managing media content 110 comprises inputs 112, processing modules 114, and outputs 116.

The inputs 112 comprise one or more sources of media content 120 (also referred to herein as "source" or "sources"). Media content may include content in any media format. Some examples of content may include, but are not limited to, audio files, video files, image files, multimedia files, and the like. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, wmf, and the like.

In one embodiment, the one or more sources of media 120 content may be libraries 120(a) such as libraries for media players including, but not limited to, iTunes media players, Windows Media Player (WMP), RealPlayer and the like. Each library 120(a) may have N collections. A collection is a subset of the files in the library. The collections may be comprised of references to the files. Each collection may refer to anywhere from zero files to all of the files in the library. An example of a collection for a music library may be a playlist. In another embodiment, the sources of media content 120 may be files within one more folders 120(b) on a single computer system or on multiple computer systems.

The processing modules 114 comprise software and/or hardware subsystems to transfer media content from media sources to devices with media players. In some embodiments, the various subsystems may be implemented with software that is executable by a processor. In other embodiments, the various subsystems may be implemented with computer hardware. In still further embodiments, the various subsystems may be implemented with a combination of computer hardware and software.

The processing modules operate as a "connector" meaning that the processing modules interface between the media sources and different types of devices with media players including, but not limited to mobile wireless devices. The processing modules may use, but are not limited to, a Windows COM interface when connecting to the media sources. In addition, the processing modules create a representation (e.g., a library or libraries) of the media content available from multiple sources.

In some embodiments, the output 116 of the processing modules is a representation created by the processing modules. In some embodiments, the representation may also be maintained by the processing modules. In other embodiments, the output also comprises device specific data for a mobile wireless device or a media player. In still other embodiments, the output also comprises metadata such as metadata based on user preferences or device settings.

In an example embodiment the representation is any means for identifying the content of the media source files. In some embodiments, the representation is a library file that is created by the processing modules. The library file contains metadata for the media content available in the one or more media sources, but omits the actual media content. The library file may be organized using a standard format that represents the information contained in the media sources. In some embodiments, the standard format is a compressed format and/or a format that is substantially smaller than the media library itself. For example, a media library with 30 GB of audio files may be represented by the media sync engine 104 in a file that may be 200 KB.

Figure 2:
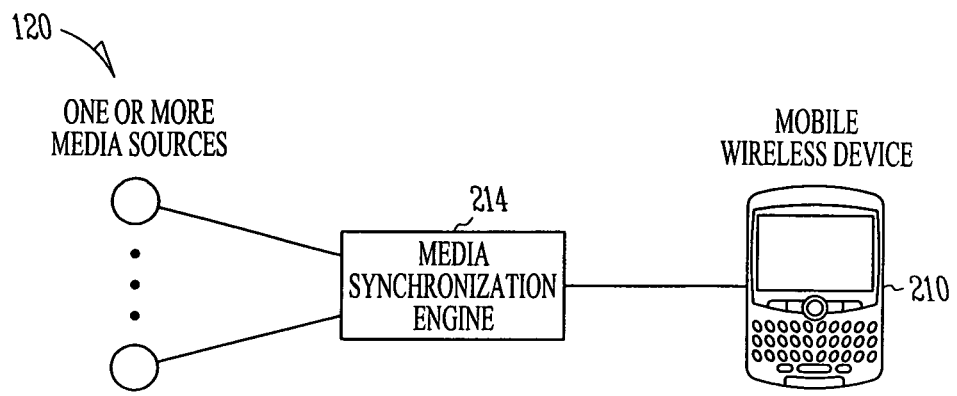
FIG. 2 is a block diagram of a system for transferring media content to mobile wireless devices according to an example embodiment.

FIG. 2 is a block diagram of a system for transferring media content to mobile wireless devices according to an example embodiment. The system for transferring media content 200 comprises one or more media sources 120, a media synchronization engine 214 (also referred to as a media sync engine or a media sync application), and a mobile wireless device 210.

The media synchronization engine 214 creates a representation of media content available from the one or more media sources 120 and provides selected media content from the one or more media sources 120 to the mobile wireless device 210. In one embodiment, the media synchronization engine 214 is an example of the processing modules shown in FIG. 1.

In one embodiment, the media synchronization engine 214 provides a method to synchronize a media library such as an iTunes digital music library with a smartphone such as a BlackBerry brand smart phone. The media content may be transferred from the iTunes digital music library to the Blackberry brand smart phone using a wireless connection or a wired connection such as a High Speed USB 2.0 connection.

The mobile wireless device 210 may include, but is not limited to, mobile telephones, portable computers, personal digital assistants (PDAs), media players and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer.

In operation, the system for transferring media content shown in FIG. 2 creates a representation of the media content available in one or more media sources and provides a means for accessing the media content from any mobile wireless device with a media player (such as a mobile wireless device 210). In one embodiment, a user browses the media content from a personal computer and selects the media content to transfer to the mobile wireless device. In an alternative embodiment, the mobile wireless device may browse the representation either locally or remotely and may select individual media content items to copy or transfer from the media source to the device. After selection, all or a portion of the media content items may be transferred to and stored on the mobile wireless device as well as played on a media player on the mobile wireless device. The collection of media content items stored on a mobile wireless device may be changed by modifying the selection of media content to copy to the mobile wireless device and resynchronizing the mobile wireless device with the media synchronization engine.

Figure 3:
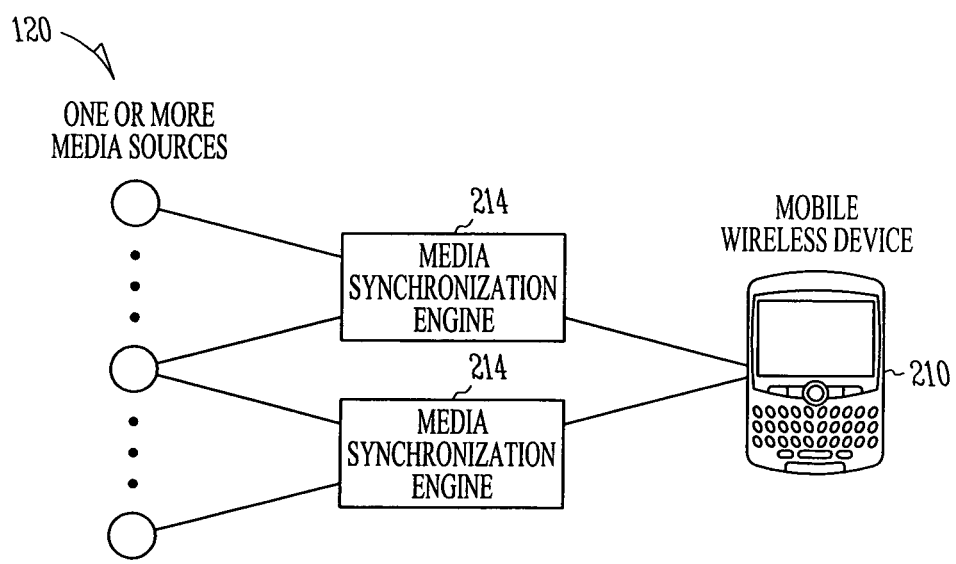
FIG. 3 is a block diagram of a system for transferring media content according to an alternative embodiment.

FIG. 3 is a block diagram of a system for transferring media content 300 according to an alternative embodiment. As shown in FIG. 3, the system for transferring media content 300 comprises one or more media sources 120, one or more media synchronization engines 214 (also referred to as a media sync engine or a media sync application), and a mobile wireless device 210.

The system for transferring media content 300 shown in FIG. 3 differs from the system shown in FIG. 2 in that it has multiple media synchronization engines and each one of the media synchronizations engines may have access to the same or different sources of media content. In some situations, a user of a mobile wireless device may wish to use the mobile wireless device with more than one media synchronization engine 214 or to transfer media content to the mobile wireless device 120 from more than one computer. For example, a user may have a first media synchronization engine 214 installed on the user's home computer to manage their personal media libraries such as music, videos, and photos. The same user may have a second media synchronization engine 214 installed on the user's computer at work to manage their work-related media libraries such as audio recordings of business meetings. The user may wish to have media content from both their personal media libraries and their work-related media libraries coexist on a single mobile wireless device 210.

The system for transferring media content 300 shown in FIG. 3 enables a mobile wireless device 210 to connect to multiple media synchronization engines 214. In one embodiment, each one of the media synchronization engines 214 may be an application program installed on a different computer system. As a result, the system for transferring media content 300 shown in FIG. 3 allows an individual mobile wireless device 210 to connect to more than one computer. When a second media synchronization engine 214(b) is accessed subsequent to a first media synchronization engine 214(a), the second media synchronization engine 214(b) recognizes that media content already present on the mobile wireless device 210 was added to the device by a different media synchronization engine 214(a) and, as a result, does not copy over the content already present on the device.

In an alternative embodiment, when a second media synchronization engine 214(b) is accessed subsequent to a first media synchronization engine 214(a), the second media synchronization engine 214(b) may notify a user of the device 210 that media content is already present on the device. The second media synchronization engine 214(b) may allow the user to choose whether the media content from the first media synchronization engine 214(a) is overwritten or maintained when the device synchronizes with the second media synchronization engine.

In still another embodiment, a first media sync engine 214(a) and a second media sync engine 214(b) may have access to some of the same media sources 120. If the mobile wireless device 210 is synchronized with both of the media sync engines 214(a), 214(b), the subsequently accessed media sync engine may recognize that some of the content already present on the device is the same as some of the content also available from the subsequently accessed media sync engine. For purposes of this example, the content in the media sources 120 that is common to both of the media sync engines is referred to as common content. If some of the common content is already present on the mobile wireless device 210 as a result of synchronizing with the first media sync engine 214(*a*), the second media sync engine 214(*b*) will recognize that the common content is already present on the device and will not transfer the common content to the device again even if some of the common content is selected to be transferred to the device.

Figure 4:
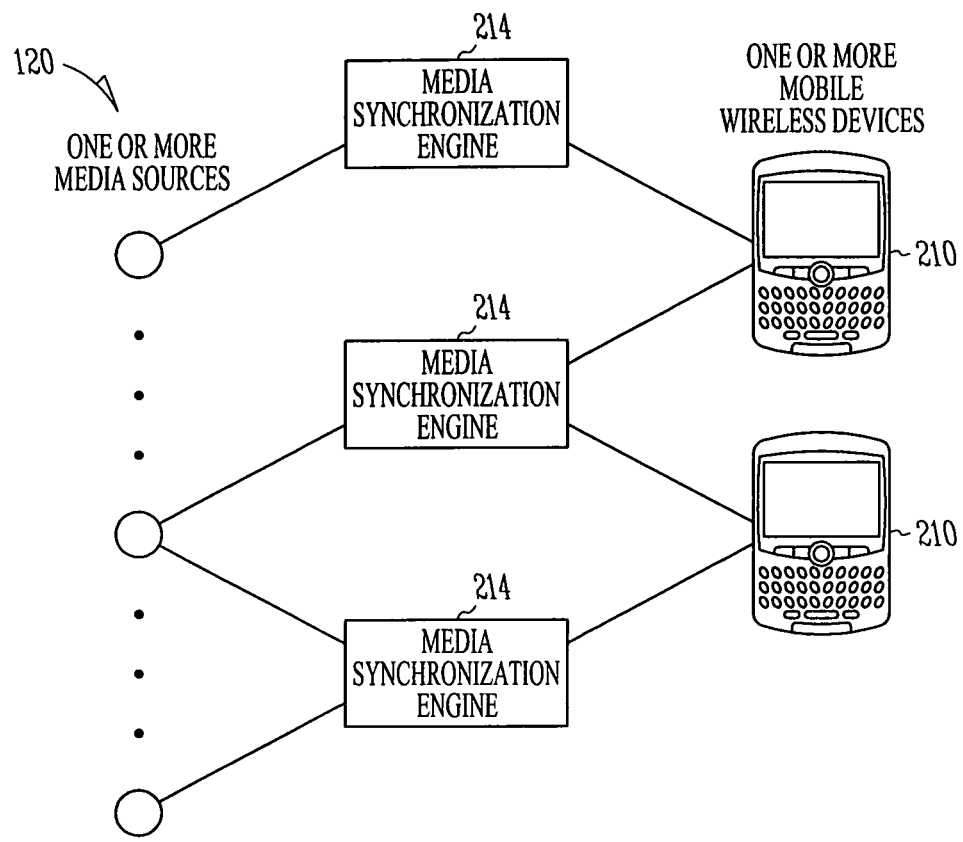
FIG. 4 is a block diagram of a system for transferring media content according to an additional alternative embodiment.

FIG. 4 is a block diagram of a system for transferring media content 400 according to an additional alternative embodiment. The system for transferring media content 400 comprises one or more media sources 120, one or more media synchronization engines 214, and one or more mobile wireless device 210. The system for transferring media content 400 shown in FIG. 4 differs from the system shown in FIG. 3 in that it has multiple mobile wireless devices 210.

In some embodiments, a single media synchronization engine 214 may synchronize with more than one mobile wireless device. In some instances, if the mobile wireless device is assigned a common name such as "Joe's Phone," the common name may be displayed to the user when the mobile wireless device is connected to one of the media synchronization engine(s). As a result, if multiple wireless mobile devices are connected to a single media synchronization engine, the user may see the common name given to each wireless mobile device before choosing which one the user would like to synchronize.

Example embodiments of systems for transferring media content have been described by reference to FIGS. 1-4. These systems may generally be described as computer-implemented or computerized systems for synchronizing media files available from multiple sources using multiple media synchronization engines. A single mobile wireless device may access and synchronize with more than one of the media synchronization engines according the example methods described in the next section.

Methods. In this section, particular methods of example embodiments are described by reference to a series of flow charts. In one embodiment, the methods to be performed constitute computer programs made up of computer-executable instructions.

Figure 5:
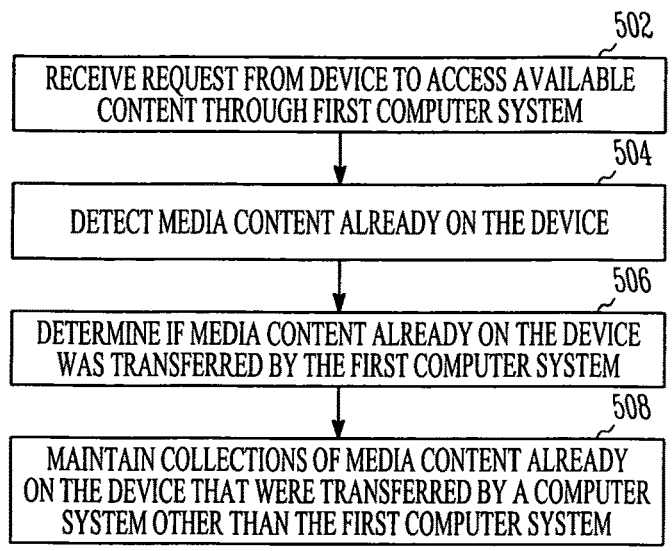
FIG. 5 is a flow chart of a method of transferring media content according to an alternative embodiment.

FIG. 5 is a flow chart of a method of transferring media content according to an example embodiment. In some embodiments, the method shown in FIG. 5 is to be performed by a media synchronization engine running on a computer system.

As shown in FIG. 5, a request is received from a device to access available content from one or more media sources through a first computer system (block 502). The media synchronization engine running on the first computer system determines if any media content is already present on the device (block 504) and also if that media content was transferred to the device by the first computer system's media synchronization engine (block 506).

If one or more collections of the media content that are already present on the device were not transferred by the first computer system's media synchronization engine; then, in one embodiment, the first computer system's media synchronization engine will not overwrite the media content already present on the device that came from a different computer system. Instead, the first computer system's media synchronization engine recognizes that the device has previously synchronized with a different media synchronization engine on a different computer system. When the first computer system's media synchronization engine is synchronized with the device, the media synchronization system will transfer a desired library to the device without overwriting the collections of media content transferred by a computer system other than the first computer system (block 508). Thus, a media synchronization engine running on one computer system is capable of synchronizing with a device in a manner that maintains the collections of media content previously transferred to the device from a different media synchronization engine on a different computer system.

Embodiments of the disclosure are not limited to the operations shown in FIG. 5. Additional or different operations may be used in different implementations of the disclosure.

Figure 6:
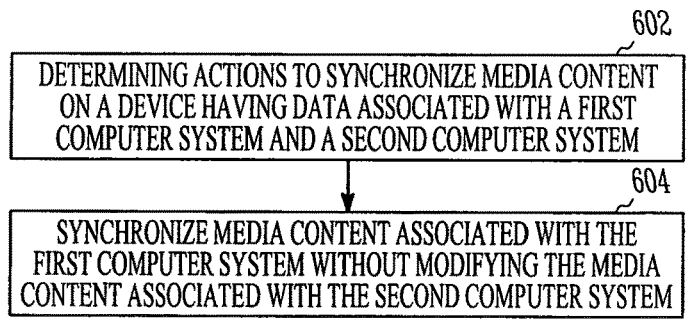
FIG. 6 is a flow chart of a method of transferring media content according to an alternative embodiment.

FIG. 6 is a flow chart of a method of transferring media content according to an alternative embodiment. In some embodiments, the method shown in FIG. 6 is to be performed by a media synchronization engine running on a computer system.

A media synchronization engine running on a computer system determines one or more actions to synchronize media content on with a device (block 602). The device has both data associated with a first computer system and data associated with a second computer system (block 602). The media content associated with the first computer system on the device is synchronized without modifying the media content associated with the second computer system (block 604).

In some embodiments, synchronizing the media content comprises adding media content to the device or removing media content from the device. Synchronizing the media content may be performed over a wired or a wireless connection. Embodiments of the disclosure are not limited to the operations shown in FIG. 6. Additional or different operations may be used in different implementations of the disclosure.

Figure 7:
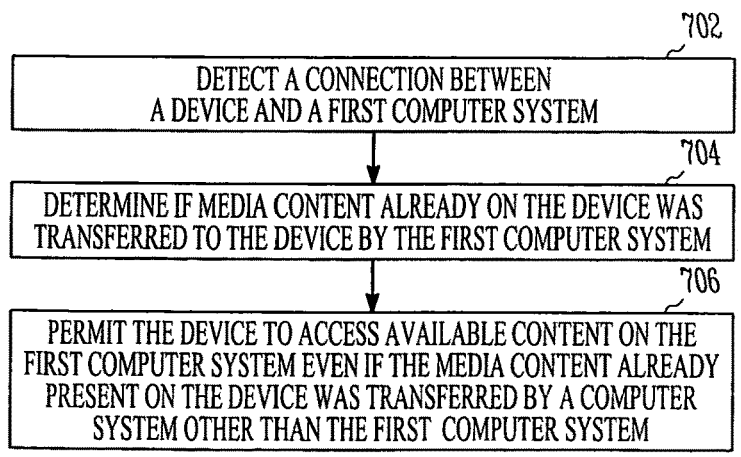
FIG. 7 is a flow chart of a method of transferring media content according to an alternative embodiment.

FIG. 7 is a flow chart of a method of transferring media content according to an alternative embodiment. In some embodiments, the method shown in FIG. 7 is performed by a media synchronization engine running on a computer system.

When a connection between a device and a first computer system is detected (block 702), a media synchronization engine on the first computer system determines if media content already present on the device was transferred to the device by the first computer system (block 704). Even if the media content already present on the device was transferred by a computer system other than the first computer system, the first computer system will permit the device to access the first computer system's available content (block 706). Thus, the fact that a device has previously been synchronized with a media synchronization engine on one computer does not prevent the device from accessing available content through a different media synchronization engine on a different computer.

In some embodiments, at least some of the available content is transferred to the device using the media synchronization system on the first computer system without overwriting the media content already present on the device that was transferred by a different media synchronization engine on a different computer.

Embodiments of the disclosure are not limited to the operations shown in FIG. 7. Additional or different operations may be used in different implementations of the disclosure.

Figure 8:
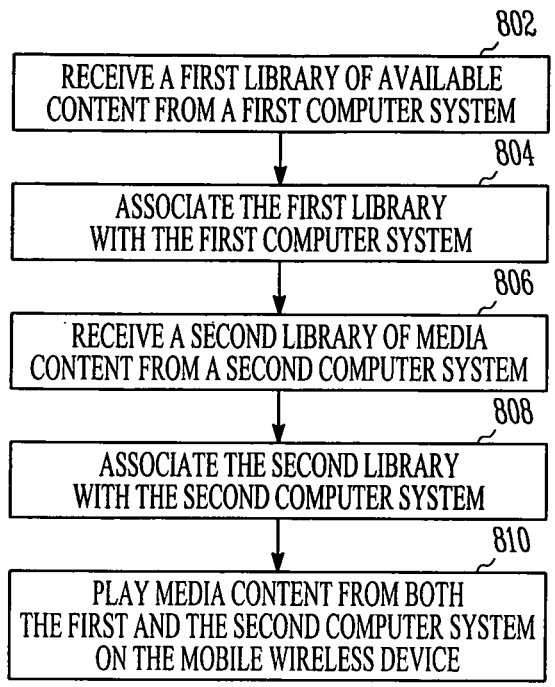
FIG. 8 is a flow chart of a method of transferring media content according to an alternative embodiment.

FIG. 8 is a flow chart of a method of transferring media content according to an alternative embodiment. In some embodiments, the method shown in FIG. 8 is performed by a mobile wireless device. However, embodiments of the disclosure are not limited to mobile wireless devices. The method of transferring media content shown in FIG. 8 may be performed by any computing system including, but not limited to, personal computers and enterprise servers.

A first library of media content is received by a mobile wireless device from a first computer system (block 802). The mobile wireless device associates the media content from the first library with the first computer system (block 804). A second library of media content is received by a mobile wireless device from a second computer system (block 806). The mobile wireless device associates the media content from the second library with the second computer system (block 808).

Both the first library and the second library are maintained on the same mobile wireless device. Media content from both the first library and the second library may be played using a media player on the mobile device (block 810).

In one embodiment, associating the first library with the first computer system and associating the second library with the second computer system is implemented by maintaining a first source identifier for the first computer system and maintaining a second source identifier for the second computer system. The first source identifier and the second source identifier are stored on the device.

In another embodiment, associating the first library with the first computer system and associating the second library with the second computer system is implemented by storing media content from the first library and the second library in separate data structures on the device. For example, the first library from the first computer may be stored in one folder on the device and the second library from the second computer may be stored in a second folder on the device.

In still another embodiment, the media content from the first library may be stored together on the device with the media content from the second library. In this embodiment, associating the first library with the first computer system and associating the second library with the second computer system may be accomplished by maintaining one or more settings files on the device identifying which media content is part of the first library and which media content is part of the second library.

Because each library is associated with the computer system from which the library was originally transferred, each library may be individually resynchronized with the computer system from which the library was originally transferred. In one embodiment, resynchronizing one of the libraries does not overwrite the content of the other library on the device. This allows a single device to access and synchronize with media content that is not available on the same computer system.

Embodiments of the disclosure are not limited to the operations shown in FIG. 8. Additional or different operations may be used in alternative implementations of the disclosure. Likewise, embodiments of the invention are not limited to the example methods of associating a library with a computer given above. Any method of recording which computer a device has synchronized with and what files were received from that computer may be used. In addition, rather than associating a library with a computer, in an alternate embodiment, the library may be associated with a media synchronization system on a computer.

Example Implementations. Various examples of systems and methods for embodiments of the invention have been described above. In this section provides several example implementations of the various systems and methods.

In various embodiments, a UI for managing media files on a device and pending transfers is provided. The UI may include graphical indicators for status (e.g., on device, on PC, etc) and/or actions (e.g., download, purchase, preview, email, play remotely). Some example UI screens from a device are provided in FIGS. 10-15.

The embodiments shown in FIGS. 1-8 may be implemented as a desktop application to synchronize media content with a mobile wireless communications device. The embodiments shown in FIG. 1-8 may also allow a user to use a mobile wireless communications device to browse and synchronize a library on a PC with a library on the mobile wireless communications device. An example architecture for the embodiments shown in FIGS. 1-8 is shown in FIG. 9.

Figure 9:
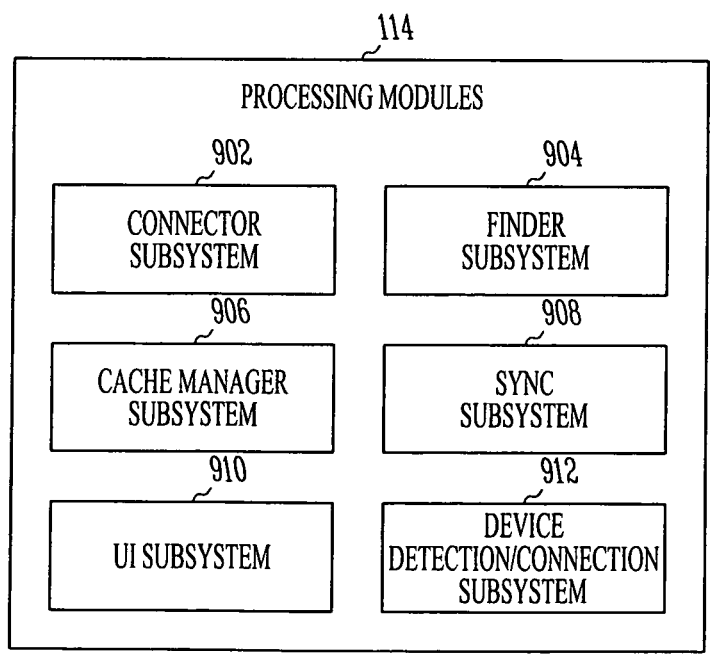
FIG. 9 is a more detailed block diagram of the processing modules shown in FIG. 1 according to an example embodiment.
Figure 10:
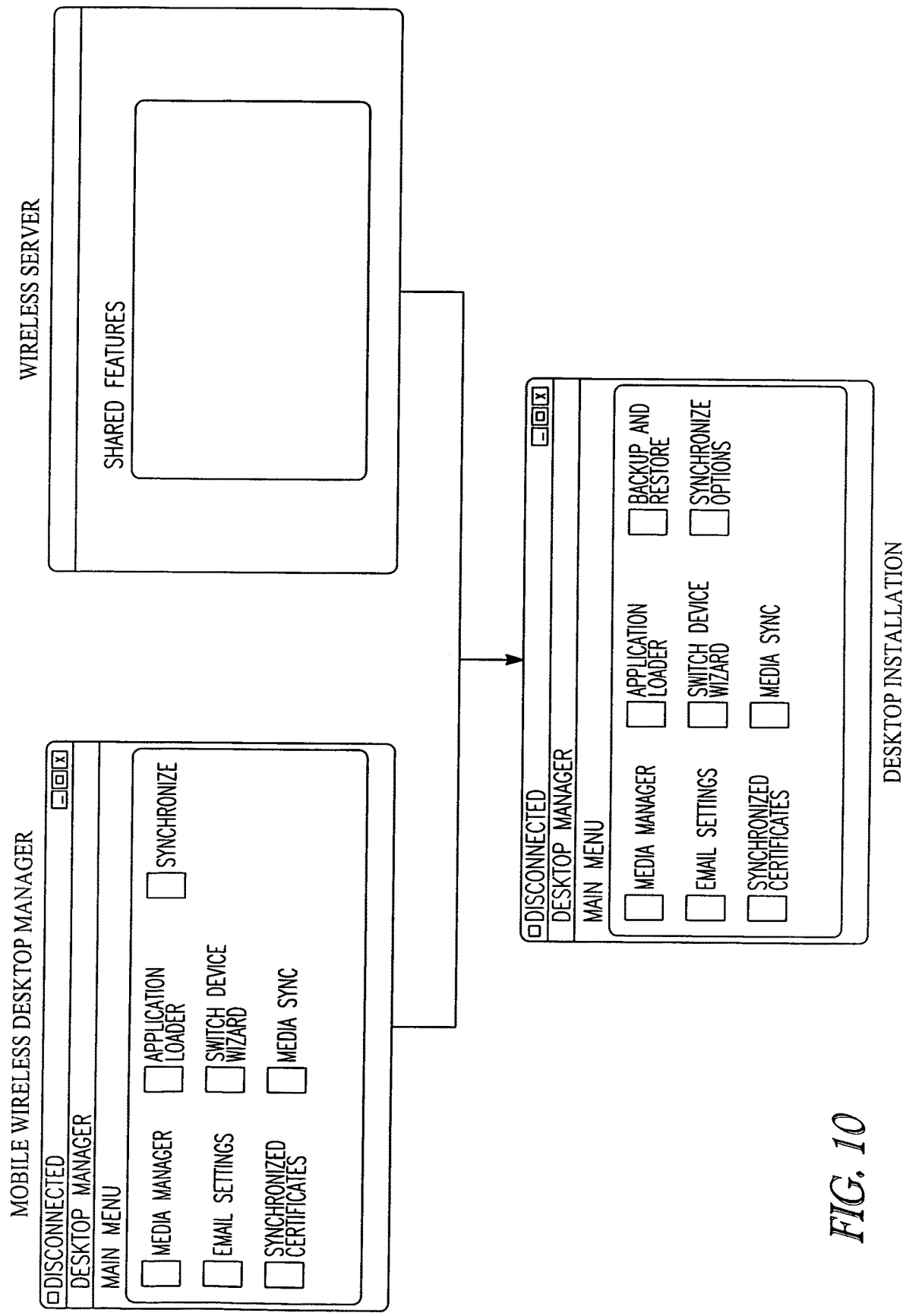
FIG. 10 illustrates an embodiment of a media wireless sync feature installed on a PC with installation of an associated wireless server, according to various embodiments.

FIG. 9 is a more detailed block diagram of the processing modules 114 shown in FIG. 1 according to an example embodiment. In the example embodiment shown in FIG. 9, the processing modules 114 for the system for managing media content 110 comprise a connector subsystem 902, a finder subsystem 904, a cache manager subsystem 906, a sync subsystem 908, a user interface subsystem 910, and a device detection/connection subsystem 912.

The connector subsystem 902 identifies specific sources of media content such as libraries or folders/files. In one embodiment, the connector subsystem 902 performs a discovery function that finds specific sources. The connector subsystem 902 may comprise one or more individual connectors. A connector is software and/or hardware that is capable of communicating with one or more sources of media content using the applicable application programming interface (API), protocols, file formats, etc. In one embodiment, each one of the connectors is capable of communicating with a specific type of media content. For example, one of the connectors may be for use with an iTunes library. In this example, when an instance of an iTunes library is discovered, the connector retrieves the collections from that instance of the iTunes library and provides information about the collections to the cache manager subsystem 906. In another embodiment, some of the connectors may each be capable of communicating with more than one type of media content. In a further embodiment, a single connector is capable of communicating with any type of media content.

In one embodiment, a connector may be a read-only connector, an index connector, or a writable connector. A read-only connector may read a source such as a library, but may not modify the source. An index connector also may not modify a source, but the index connector may more efficiently read the source than the read-only connector. In this embodiment, the index connector may implement an API or an optimized query format for the source. A writable connector may also modify a source such as a library. A connector that modifies a library may perform any action that changes the library, including writing data to the library or deleting data from the library. For example, a connector may be used to add a user assigned rating for a song to an iTunes music library. Other examples of actions that change a library include, but are not limited to, creating a playlist, editing a playlist, deleting a song, etc.

Thus, the connector subsystem 902 identifies specific sources of media content and retrieves information about the media content. The connector subsystem 902 may provide the information about the media content to the cache manager subsystem 906.

The finder subsystem 904 provides a discovery mechanism for the connectors. In one embodiment, the finder subsystem 904 identifies what connectors are available to the system for managing media content 110. In another embodiment, the available connectors register with the finder subsystem 904. If a separate connector is used for each source of media content, the particular connectors that are discovered by or registered with the finder subsystem 904 will determine what type of media content may be discovered by the system for managing media content 110.

The cache manager subsystem 906 unifies media content available to a user across multiple sources. The cache manager subsystem 906 may receive information about media content from the connector subsystem 902. In one embodiment, the cache manager subsystem 906 maintains one or more data structures for the media content that is available to transfer to the device. The data structures in the cache manager subsystem 906 unify information about media content that is stored in independent sources. For example, if the same music track is present in multiple libraries (e.g., in a user's iTunes library and in the user's Windows Media Player library), the cache manager subsystem 906 may maintain a single data structure that is an aggregation of the tracks from the different libraries. Alternatively, the cache manager subsystem 906 may maintain a separate data structure for the tracks from each of the different libraries. The cache manager subsystem 906 may store the data structure(s) using any form of data storage. The data storage may be volatile or non-volatile and may be implemented using any method or technology for storing of information. In addition, in some embodiments, the cache manager subsystem 906 may maintain one or more data structures for media that is available to transfer from the device to a computer (e.g., a desktop computer, an enterprise server, a laptop computer, and the like). For example, media files such as pictures or videos may be transferred from the device to the computer. In this case the device, is also treated as another source in the system for managing media content 110.

In some embodiments, the cache manager subsystem 906 may implement connector watchers. A connector watcher monitors one or more sources of media content and determines when the source has changed. For example, if the iTunes xml file changes or if the iTunes library has been updated, the connector watcher that is monitoring the particular source detects the update and updates the appropriate data structure in the cache manager subsystem 906 with the updated information about the media content.

In one embodiment, the cache manager subsystem 906 may also determine which of the available connector(s) to use. For example, if media content may be accessed either by using the iTunes software or through the iTunes xml file, the cache manager subsystem 906 determines whether to use iTunes application connector or the iTunes xml file connector in order to access the iTunes media content. In an alternative embodiment, the finder subsystem 904 may determine which of the available connector(s) to use.

Thus, the cache manager subsystem 906 brings together information about media content from multiple media sources that would otherwise have to be accessed directly from each media source and the cache manager subsystem 906 provides the information to the sync subsystem 908.

The sync subsystem 908 allows a device to be synchronized with all or a subset of the available content from different sources. In one embodiment, the sync subsystem 908 may provide the UI subsystem 910 with information about media content that is available to transfer to the device (also referred to as "available content") as well as information about media content that is already present on the device. The sync subsystem 908 may retrieve information about the available content from the data structure(s) maintained by the cache manager subsystem 906. The information maintained by the cache manager subsystem 906 represents the content available from multiple sources that a user may select to transfer to a device. The sync subsystem 908 may also retrieve information about the content that is already present on the device either from the device itself or from a storage location other than on the device. In addition, in some embodiments, the sync subsystem 908 also allows a computer (e.g., a desktop computer, an enterprise server, a laptop computer, and the like) to be synchronized with all or a subset of the available media content from the device as a source of media content. For example, media files such as pictures or videos may be transferred from the device to the computer.

In some embodiments, the sync subsystem 908 may also maintain a desired library. The desired library identifies the media content that is to be stored on the device after selections from either the user or the system for managing media content are applied. A desired library may include all of the media content in the user's various sources (the available content) or the desired library may be a subset of the available content. In one embodiment, the desired library functions as a filter for the content to be transferred to the device. Rather than transferring all of the content available from the user's various collections of media content, just the content that is selected for the desired library is transferred to the device. The desired library may be selected by the user through the UI subsystem 910 or may be automatically selected by the system for managing media content or may be selected through some combination of both. In an alternative embodiment, the desired library may be maintained by the cache manager subsystem 906 rather than by the sync subsystem 908. In some embodiments, the content of the desired library persists even when an application program to implement the system for managing media content is not running or when a computer system running such an application program is restarted.

In some embodiments, the sync subsystem 908 may also identify the actions to create the desired library on the device (e.g., copying songs or playlists, deleting songs or playlists, etc.) and, in some embodiments, the sync subsystem 908 may manage the actual transfer of media content to create the desire library on the device.

Thus, sync subsystem 908 provides information about both the available content and the content that is already present on the device to the user interface subsystem 910 so that a user may view the information. The sync subsystem 908 may also maintain a desired library and/or determine the actions to synchronize the device with the desired library.

The user interface (UI) subsystem 910 provides a graphical user interface through which a user may access media content from multiple sources. The UI subsystem 910 receives from the sync subsystem 908 aggregated information about media content available from the different sources. The UI subsystem 910 also receives from the sync subsystem 908 information about media content that is already available on the device. The UI subsystem 910 presents this information to the user through a graphical user interface. In one embodiment, the graphical user interface is part of an application program such as a media sync application program running on a computer system other than the device. In another embodiment, the graphical user interface is part of an application program running on the device itself.

The UI subsystem 910 allows the user to browse the available content as well as the content that is currently stored on the device. The UI subsystem 910 may display the content so that it may be browsed by individual media files (songs, photos, movies, etc.) or by groups of media files (e.g., playlists, albums, folders, etc.) or as some combination of both.

The UI subsystem 910 also allows the user to create a desired library (i.e., the media content that the user wishes to have on the device after the media content on the device is updated). In one embodiment, the user may select media content using graphical user interface options for adding a track or playlist to the desired library, removing a track or playlist from the desired library, and so on. In another embodiment, the user may select a graphical user interface option that instructs the system for managing media content 110 to automatically select the media content to be transferred to the device. In some embodiments, the system for managing media content 110 may also automatically select the content to transfer to the device even though the user has not selected such an option. This may occur when the user creates a desired library that requires more space than is available or is allocated for media content on the device. For example, a user may create a desired library with 20 gigabytes of music, but the device only has space for a library with 1 gigabyte of music. In this example, the system for managing media content 110 may automatically select one gigabyte of music from the 20 gigabytes of music in the desired library to transfer to the device.

The UI subsystem 910 may display a current state of the desired library as the user creates or modifies the desired library. In some embodiments, the UI subsystem 910 may also display an indication of what will happen if the current state of the desired library is transferred to the device. If the desired library is too large for the space available on the device, the system for managing media content may further limit the content that is transferred to a subset of the desired library. This may occur if the user creates a desired library that requires more space than is available on the device.

In some embodiments, the UI subsystem 910 may also display information about the device. The UI subsystem 910 may receive information about the device from the device detection and connection subsystem 912. For example, the UI subsystem 910 may display a graphical representation of how much data storage space on the device is currently consumed and how much data storage space the desired library will use on the device. In some embodiments, information about the device capacity may be presented using categories. For example, the categories may include, but are not limited to, "used," "music," and "free." In one embodiment, the categories of data are presented on a memory bar that graphically indicates how much space on the device is "free", how much space on the device is used for "music" or "playlists", and how much space on the device is "used" for other data. In addition, the UI subsystem 910 may also display an amount of "reserve space" in the file system. For example, the UI subsystem 910 may present either just the free space that is available to a user, or the free space as well as an amount of reserve space. However, embodiments are not limited to displaying information in categories or presenting the categories graphically as a memory bar.

Thus, the UI subsystem 910 provides a graphical user interface through which a user is presented a single unified view of media content from multiple sources. The user may use the media content to browse and manage the media content. In addition, in some embodiments, the UI subsystem 910 may also graphically indicate when a device is connected to the system for managing media content 110. For example, when the device detection and connection subsystem 912 determines that a device is connected, the UI subsystem 910 may display an image of a device on the graphical user interface.

The device detection and connection subsystem 912 identifies when a device is connected or disconnected from the system for managing media content. A device may be connected using a wireless connection or a wired connection such as a High Speed USB (Universal Serial Bus) connection.

When a device is connected to the system, the device detection and connection subsystem 912 may also obtain information from the device such as information about device characteristics (e.g., screen size, screen resolution, etc.) device capabilities (e.g., file system and supported file formats), files already available on the device, device capacity or available storage space, and so on. In an example embodiment, the information from the device may influence what types of connectors are selected by the connector subsystem 902. For example, if the device only supports one type of file format, then only the connectors for libraries with files of that particular format may be invoked. As a result, the information maintained in the cache manager subsystem 906 and provided to the sync subsystem 908 as available content for the desired library will only be files that are supported by the device. In this sense, the information from the device is used to filter the available content. In one embodiment, this filter may contain supported extensions by the device, and this filter will be applied on the desired library in order to get a subset of media files/playlists that can be played/viewed on the device. The supported extensions filter will vary by device version, or the software version running on the device. A filter may be applied on the content read from the device. For an example, if the device contains media previously synched from more than one computer, a filter may be applied to only read in the data previously synched from the current computer the media app is running from. In addition, in some embodiments, the device detection/connection subsystem 912 may also enable a user's access to a device by prompting for a password from the user and then providing the password to the device.

The processing modules 114 for the system for managing media content 110 are not limited to the connector subsystem 902, the finder subsystem 904, the cache manager subsystem 906, the sync subsystem 908, the user interface subsystem 910, and the device detection/connection subsystem 912. The subsystems described by reference to FIG. 9 are for illustrative purposes only. Different implementations of the system for managing media content may comprise additional or different subsystems that will allow a user to transfer media content from multiple media sources to a mobile device.

In various embodiments, device configurations and operational methods are provided for a user of a mobile wireless communications device to remotely view and/or manage their music home music libraries directly from their mobile wireless communications device with the ability to synchronize/transfer music through wired connectivity and/or wirelessly and justifies them within their context of use. Such transfer may be realized in a personal computer (PC). Such transfer may be realized in a wireless server in which the user and/or the mobile wireless communications device are registered as being allowed to enter into such transfers. The wireless server may be configured in a personal computer. The mobile wireless communications device may be a handheld device such as a cell phone-type device. The mobile wireless communications device may be a portable computer such as a lap-top computer. Such configurations and operating structures provide a straight-forward user friendly way, both in a user's mobile wireless communications device and in a personal computer of the user, for managing multimedia files, audio files, video files, and/or combinations thereof, belonging to a user or which the user is allowed to access.

In various embodiments, transfer/sync of multimedia files, audio files, video files, and/or combinations thereof between a computer (and associated media managers of the computer) and a mobile wireless communications device may be accomplished using a number of mechanisms. The transfer/sync between the mobile wireless communications device and the wireless server maybe accomplished through a USB connection. The transfer/sync between the mobile wireless communications device and the wireless server maybe accomplished through a Wi-FI communication session. The transfer/sync between the mobile wireless communications device and the wireless server maybe accomplished over wide area network (WAN) such as a wireless network.

In various embodiments, a mobile wireless communications device is configured with hardware, software, and combinations thereof to view offline, from its associated PC or associated wireless server and offline from the Internet, a library or libraries that may include multimedia files, audio files, video files, photos, videos, podcasts, and/or combinations thereof in the mobile wireless communications device. Such libraries may include libraries of iTunes®, Windows Media Player®, other music libraries, video libraries, and other multimedia libraries. The mobile wireless communications device may include executable instructions allowing its user to view, edit, delete, and schedule multimedia, music, video, and/or combinations for sync between the mobile wireless communications device and its associated personal computer or wireless server. All changes/requests/transfers may occur automatically upon establishment of one of more of USB, Wi-Fi, or WAN connections to the associated personal computer or wireless server. In various embodiments, the personal computer may be configured with appropriate instrumentalities to operate as a wireless server. The hardware and software of the mobile wireless communications device may include a multimedia sync application having a remote management tool to manage a user's libraries of the user's PC, such as but not limited to music from the user's iTunes® or Windows Media Player® (WMP), directly from the mobile wireless communications device. Various embodiments provide functions to manage, play, and sync multimedia presentations, video, and/or music that bridge the gap between PC sync and remote access to realize media management from a handheld wireless device rather than limiting such management to a desktop.

In various embodiments, mobile wireless communications devices are configured to allow offline access to a user's entire PC music library and to allow a 2-way sync, including wireless, between the mobile wireless communications device and the target media manager on a user's PC. For example, a mobile wireless communications device may be configured to schedule downloads and syncs of media avoiding limitations associated with streaming the media content directly to the handset. The mobile wireless communications device may be configured with a remote management application and a wireless sync application, where each has access (an optimized copy) of the user's media library directly from the mobile wireless communications device. Access to this library may not require a network connection to an associated PC or a server on the Internet. The library may be arranged as a multimedia library, a music library, a video library, or a combination thereof. In an embodiment, an optimized version of a user's music library may be contained on the user's mobile wireless communications device allowing for offline viewing and management such that only the optimized music library file (i.e. an "index") is present on the user's mobile wireless communications device, not the actual songs themselves. Any edits or requests for download/sync will sync with the user's associated PC upon connection via USB, WAN, or WLAN (wireless local area network). New media content, such as new music content, that have been requested for download may be contained in a download "manager"/queue and may be sent to the user's device upon the next USB or Wi-Fi connection. The download may be sent on the next connection in a wireless network to which the computer is coupled. In an embodiment, should the user choose, they can force transfer/download of any item in the pending download queue over a cellular network.

In various embodiments, a mobile wireless communications device may be configured with hardware and software that provide: simple ease of use for the user, integration between the mobile wireless communications device and a desktop manager and/or a media sync application of a wireless server configured in a personal computer, support of USB sync, WLAN sync, WAN sync, or sync using combinations thereof between a user's PC and their mobile wireless communications device, integration with different media players such as but not limited to iTunes® and Windows Media Player®, ability for a user to view their media libraries directly from the mobile wireless communications device without a network connection for viewing via a small/optimized copy of the libraries, ability to view library content by album, artist, genre, playlists, ability to add music, such as but not limited to individual songs, albums, artists, playlists to a download manager/queue, ability to transfer/synchronize media in the download queue with the user's mobile wireless communications device upon next USB or Wi-Fi connection to their associated PC or associated PCs, and a 2-way sync with media libraries on the users home PC. A 2-way allows for activity on a mobile wireless communications device to be conducted in a manner similar to the activity of the PC. For example, if a user deletes music or creates/edits a playlist from their mobile wireless communications device, the data can be transmitted wired and/or wirelessly, and these changes reflected in the media libraries on the user's associated PC, which may include iTunes® and WMP among others. Further, if a user deletes music or creates/edits a playlist from their associated PC via one or more libraries on the PC, the data can be transmitted wired and/or wirelessly, and these changes reflected on the mobile wireless communications device. For example, new media content that have been requested for download may be contained in a download manager/queue and may be sent to the user's mobile wireless communications device upon the next USB, Wi-Fi, or wireless network connection. Should the user choose they can force transfer/download any item in the pending download queue over a cellular network.

In various embodiments, a mobile wireless communications device may be configured to operate with any operating system that may be used in a cellular device. The mobile wireless communications device may be configured with access to media functions with external controls to virtually provide for unlimited storage for a user's media, with independence from the PC desktop to manage all user media needs directly from their portable wireless device, with an open marketplace to discover/acquire music directly from a portable wireless device, with automatic updates/sync of activity conducted on a portable wireless device, with ability to play music on a portable wireless device with other devices such as a car, a home stereo, or other such device, with remote access from the user's mobile wireless communications device to access to their PC library of music and other media.

Figure 15:
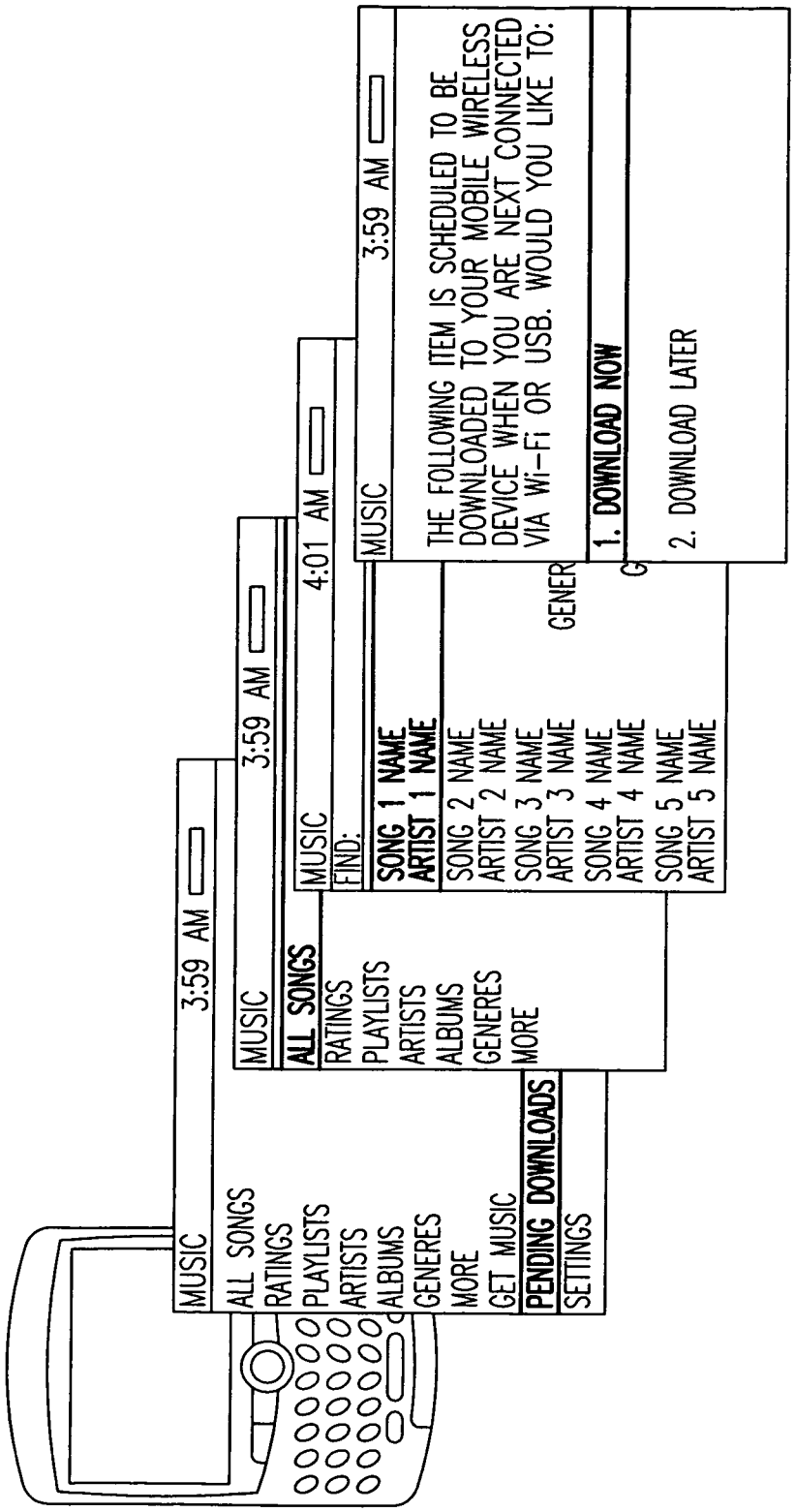
FIG. 15 shows an embodiment of an example of a user interface for viewing a download manager, according to various embodiments.

In various embodiments, a media wireless sync feature may be installed on a PC with installation of an associated wireless server, as illustrated in FIG. 15. The installation may be realized using a USB connection. The installation may be realized initiated using a USB connection and completed over an Internet connection. The installation may be realized using a Wi-Fi connection. The installation may be realized initiated using a Wi-Fi connection and completed over an Internet connection. After completion of the installation of the media wireless sync feature, a message indicating that the media wireless features/functionality are enabled may be provided to the user via the mobile wireless communications device, the PC, and/or both.

The media sync application of the mobile wireless communications device may support multiple mobile wireless communications device /users within a home, based on a registration, for example based on a personal identification (PIN). The libraries and the sync to these libraries may be partitioned among the various users of the PC. For example, one person may choose to sync music with one library such as iTunes®, another person may choose to sync with another library such as Windows Media Player®, and a third person may choose to sync with both libraries. The user interface of the wireless server on the PC may allow for dynamic selection of supported media managers as well as remember the last media manager (store the identity of the last media manager or last several media managers) to which a specific mobile wireless communications device synchronized with it and to remember preferences associated with the synchronization. In an embodiment, a file may be specified not to be transferred to the mobile wireless communications device, unless the file is supported by the mobile wireless communications device. Users may be made aware of this through a graphic user interface, if a specific file or file type has been identified as not being selectable for sync. For example, music files that are not to be synced may be shown using an icon or other indicator of a lock condition, when a user is viewing their music library from the mobile wireless communications device.

Figure 11:
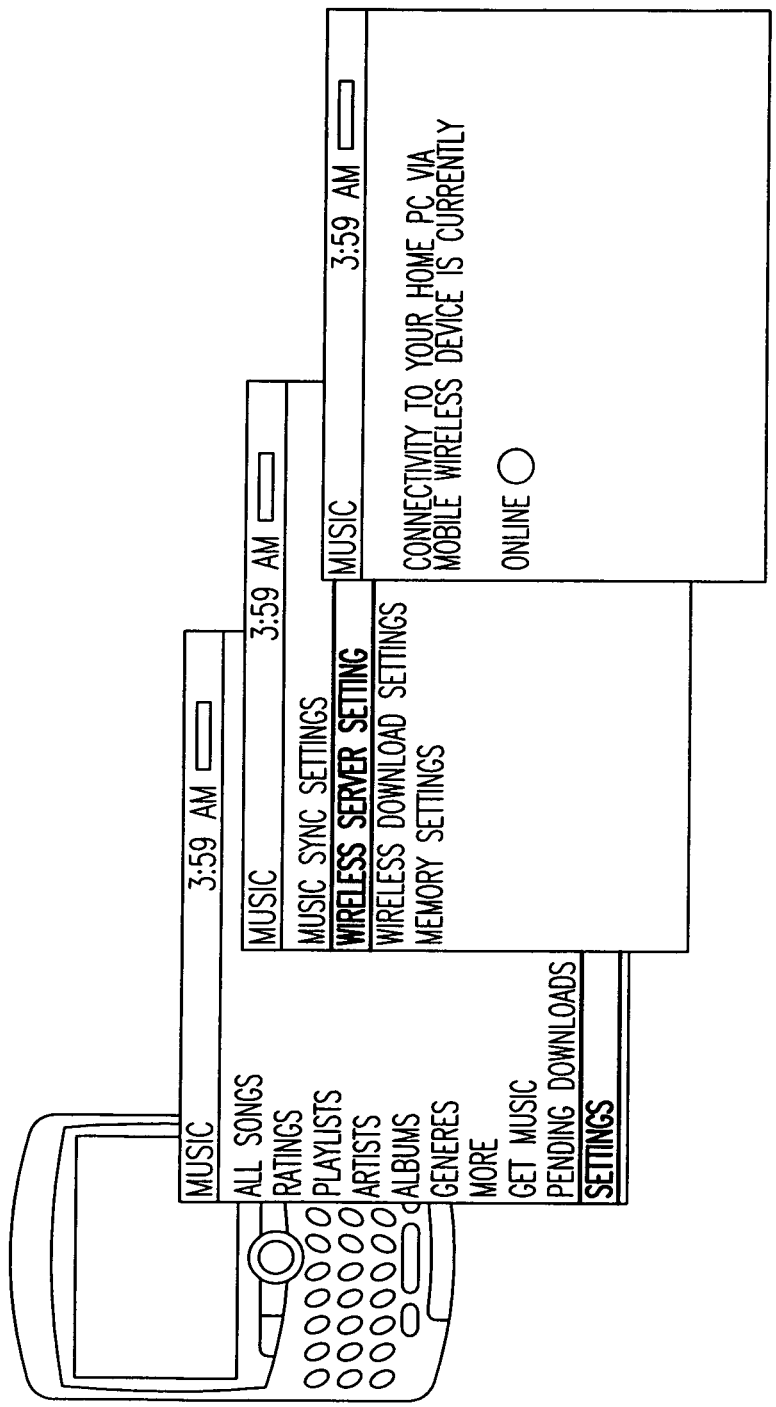
FIG. 11 illustrates an embodiment of an example of a user interface showing connectivity, according to various embodiments.

From the user's mobile wireless communications device, the user may observe the status of connectivity to their home PC via a wireless server on the home PC. This view can enable the user to determine if they are able to sync and/or download content via Wi-Fi, WAN, or other connection. FIG. 11 illustrates a non-limiting example of a user interface showing connectivity. A media sync application provides a user with an ability to view (offline) either a media library directly from a mobile wireless communications device allowing them to view, edit, delete, and schedule music for sync. All changes/requests/music transfers can occur upon a USB, Wi-Fi, or WAN connection to their home PC. With a wireless server on a home PC offline, an error message may be generated to indicate the status of the wireless server when attempting to force a transfer or download via a network connection.

An optimized version of a user's music library contained by a library in the user's PC may be contained on the user's device allowing for offline viewing and management. The optimized media library file may be arranged as an index on the user's mobile wireless communications device. Media filed in the mobile wireless communications device may be stored in the mobile wireless communications device separate from the optimized media library file. During setup (and at any time) of the desktop media sync application, users can select which media manager or managers that they would like configured for remote management and wireless sync.

From a user's mobile wireless communications device, a user may able to enter the total music library or individual libraries and sort by all songs (name), artist, album, and music genre. The user may also be able to view by all playlists, standard and smart (automatic) as well as those contained in folders. When viewing a playlist from the mobile wireless communications device, users also may able to view/sort by all songs (name), artist, album, and music genre. Viewing and sorting is not limited to music but may be applied to photos, video, and other multimedia presentations. With the optimized music library file as an index present on the users mobile wireless communications device, and not all the actual songs themselves contained within the library, the optimized library may be sufficiently small allowing the library to be stored on the internal memory of the user's mobile wireless communications device. In various embodiments, swapping memory cards does not disable remote management.

In various embodiments, the optimized media library file on the user's mobile wireless communications device may be refreshed and kept in sync with the media libraries on the user's PC. This sync may provide automatic updating so that the most up to date view of the media library accessible to the PC is available to the user from their mobile wireless communications device. An updated/synchronized copy of the media library may be transferred to the user's mobile wireless communications device upon the next USB/WLAN/WAN connection to the desktop music sync application.

Figure 12:
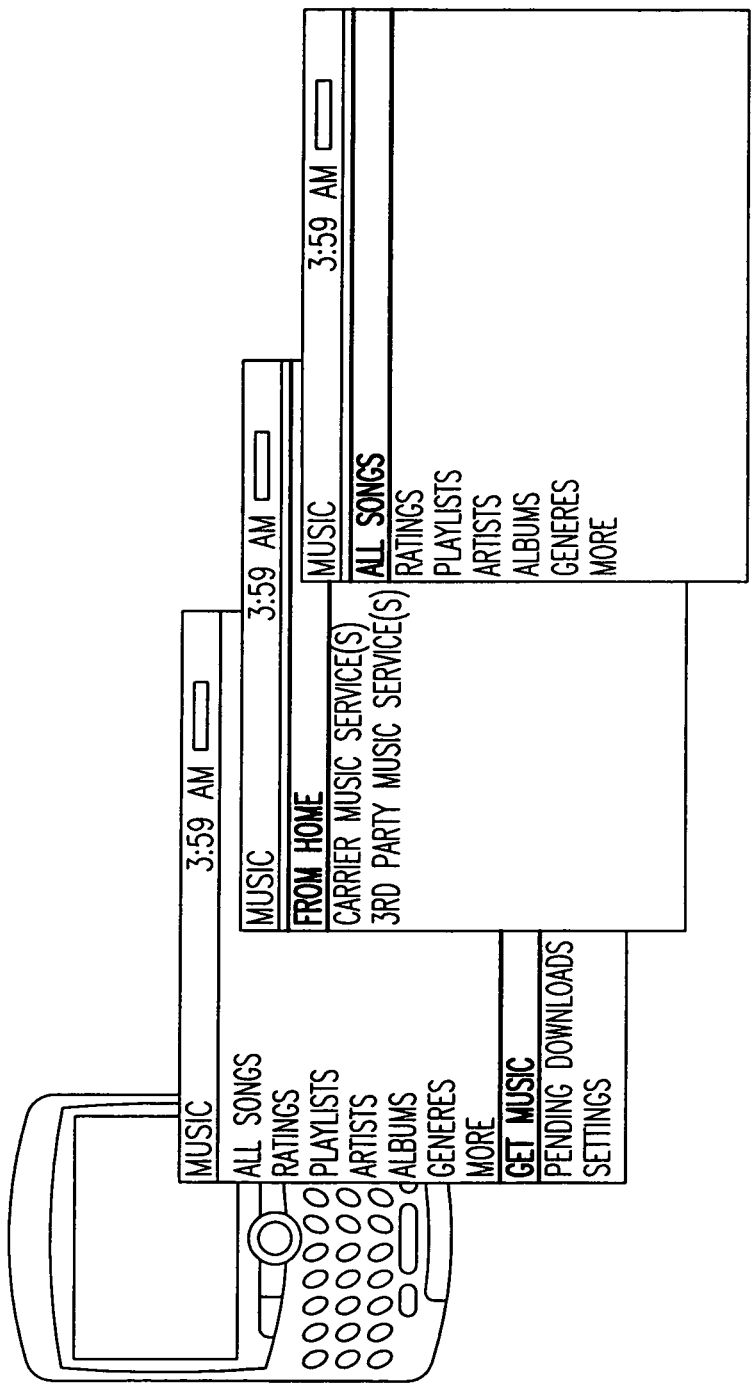
FIG. 12 illustrates an embodiment of an example of a user interface when accessing a home music library, according to various embodiments.

FIG. 12 shows an example of a user interface when accessing a home music library. The user interface is not limited to a home music library but may be libraries of other multimedia presentations. As shown, the user interface provides access and management of a user's music library, for example a user's iTunes® or WMP music library, that is easy to use, intuitive, and be structured in such a way that it allows users to easily view their music libraries directly from the music application on the mobile wireless communications device.

Figure 13:
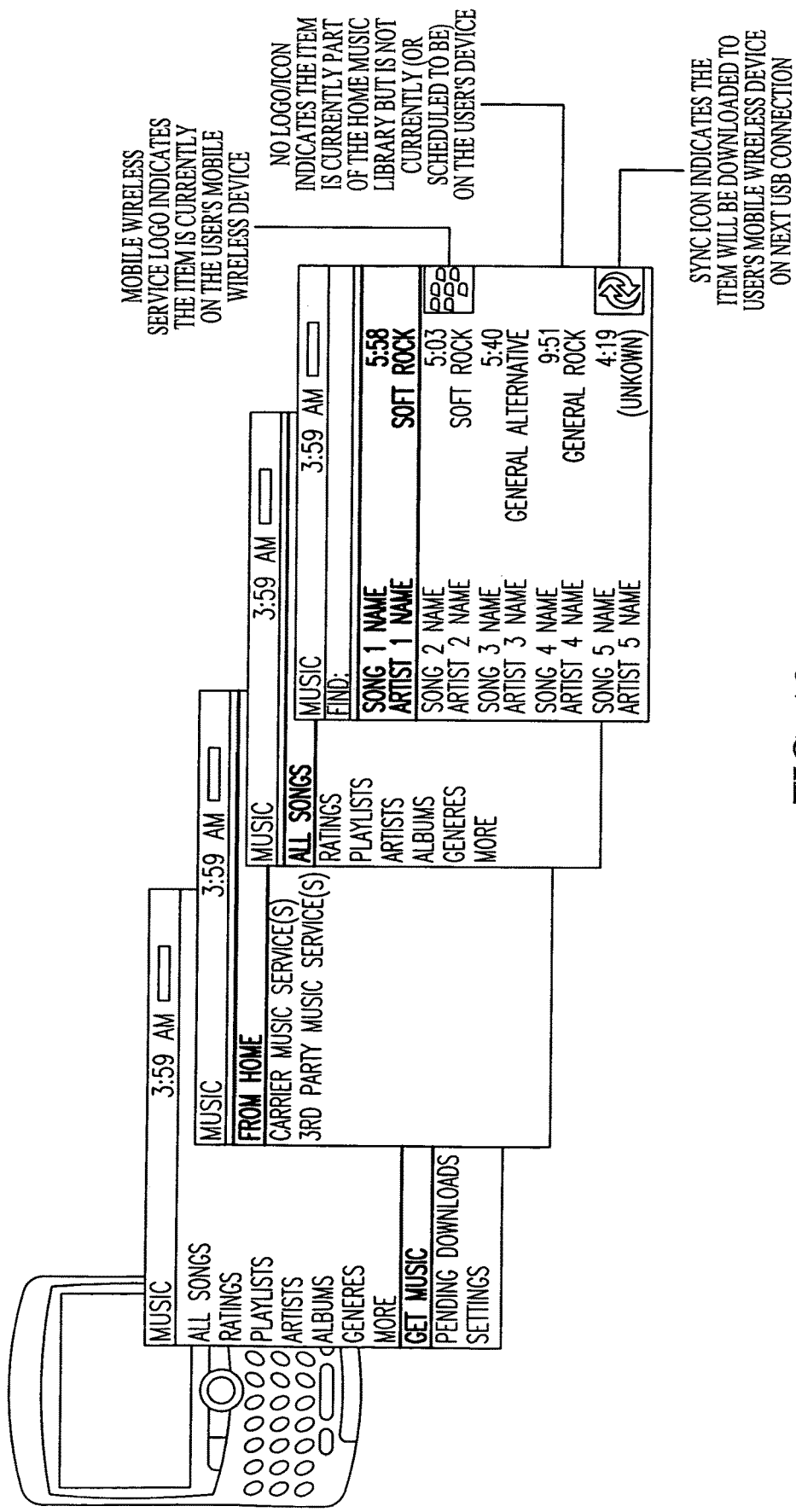
FIG. 13 illustrates an embodiment of an example of viewing a media library, according to various embodiments.

In viewing their home media library from the mobile wireless communications device, the view may be provided in a manner that it similar to how the media library is displayed on the local PC. FIG. 13 illustrates an example of viewing a media library that is easy to use, intuitive, and structured in such a way that it allows users to easily view their media library directly from the media application on the mobile wireless communications device. The view may also provide a view of media that is on their mobile wireless communications device vs. what is not on the mobile wireless communications device with respect to what is in the home libraries. The view may also provide a view of media that has been added to the media download manager as pending downloads that will be transferred/synchronized with their device upon the next USB sync, WLAN sync, or WAN sync with the mobile wireless communications device. The user may also be provided with an indication of the total amount of memory corresponding to media on their mobile wireless communications device including free/available memory, media at an associated PC such as a home PC, and media in the download manager pending download. The media may be further presented in various categories such as music, video, and other multimedia presentations.

In various embodiments, when a user views their home music library, it may be similar to how they view the media local to their mobile wireless communications device to edit the home media library. Users may be able to edit their home music library from a remote management application with a wireless sync feature allowing them to delete media, such as music, on a selected basis and/or edit playlists. For example, the selected basis allows for editing music based on individual songs, albums, artists, genres, or playlists. For example, using edit playlists as a basis allows for adding and/or removing songs contained in one or more playlists. These edits may sync with the users PC and the corresponding media manger library or libraries upon the next USB/WLAN/WAN connection to the desktop media sync application on their home PC. Delete actions may be accompanied by a prompt inquiring as to whether or not the user would like to delete the item from the specified library on the mobile wireless communications device only (keep file on computer) or from the specified library on the associated computer as well.

Figure 14:
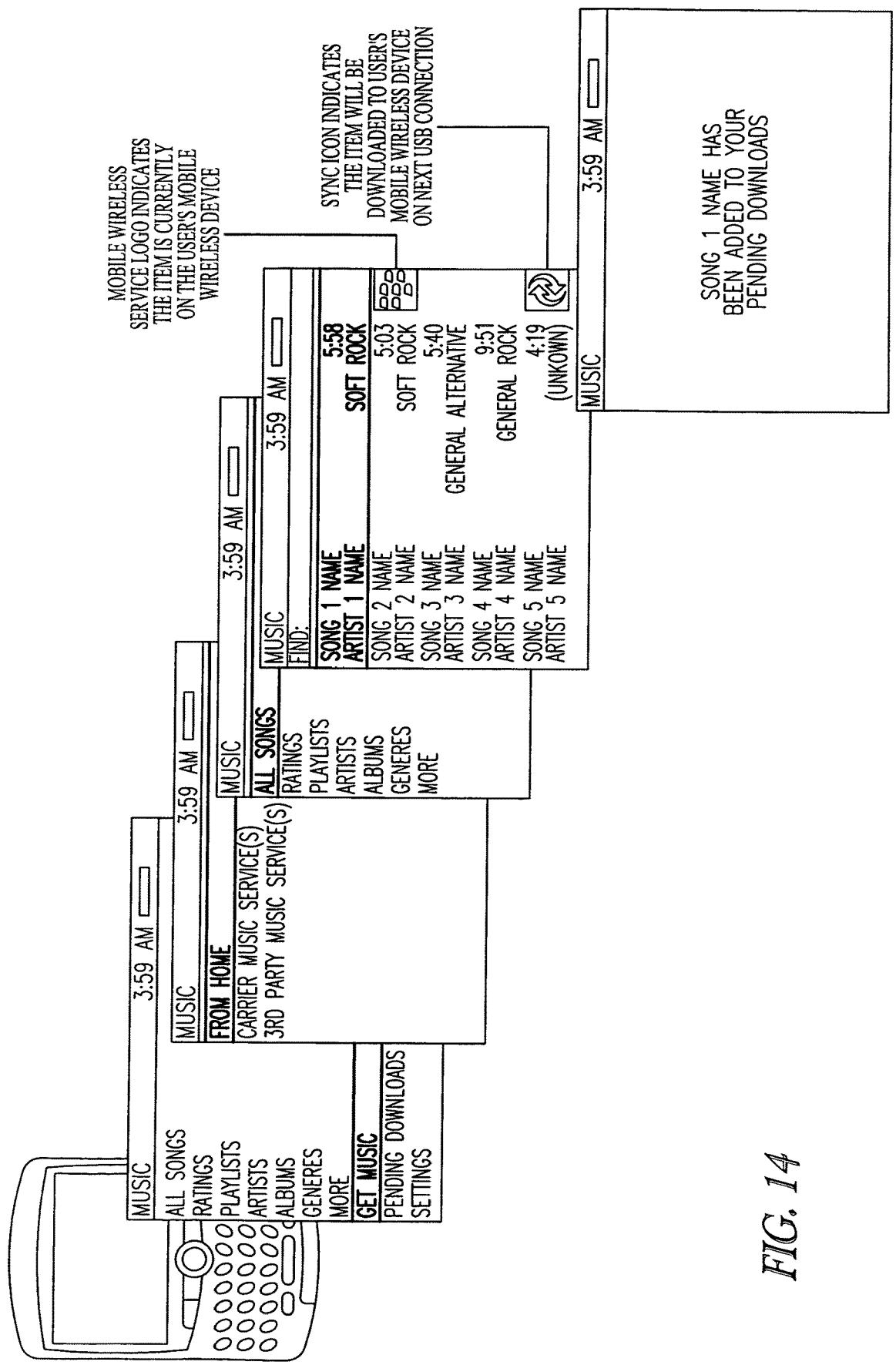
FIG. 14 shows an embodiment of an example of a user interface with respect to adding music to the download manager, according to various embodiments.

FIG. 14 shows an example of a user interface with respect to adding music to the download manager. While viewing a user's home music library, the user may add the following to a download music manager as pending downloads: individual songs, individual albums, individual artists (all songs by an individual artist), individual genres (all songs contained in a single genre), entire playlists, and other categories for arranging music. Additions are not limited to music, but apply to other multimedia presentations. As an example, this addition feature can be shown as a menu item called "sync with mobile wireless communications device" or "add to downloads" when any of the above categories is highlighted. This may be similar to how adding items local to a mobile wireless communications device is handled with respect to playlists local to the mobile wireless communications device. Users may be able to view all items that are currently "pending sync/download." A remote media access implementation may notify a user if they are attempting to schedule/sync content whose total is larger than the device's available/free memory (external plus internal). The user may be notified/prompted on their device of the total content they are attempting to sync (i.e. what is in the media download manager or "pending downloads" queue) and the available space on the mobile wireless communications device and be instructed to remove content from the sync list or device.

FIG. 15 shows an example of a user interface for viewing a download manager. This view provides users with the ability to view the media download manager for pending downloads directly from the media home screen of the mobile wireless communications device media player. For example, music that has been requested for download (added to the pending downloads/queue) can be delivered to the mobile wireless communications device upon the next USB, Wi-Fi, or WAN connection. Viewing the items in the pending downloads list may be similar to viewing music on a users mobile wireless communications device and can be sortable (with totals next to each in brackets) by all songs, album, artist, genre, playlists, and other categories.

A user may be provided with a view that indicates in a straight forward manner the total amount of memory corresponding to individual items in the download manager and to total items in the download manager. The following options may be available to the user when viewing the contents of the download manager: (1) delete (i.e. remove items from the download manager), which may include an item no longer being requested for transfer/sync with the device, and (2) download now, which allows for manual force transfer of media via a WAN. Users may be prompted that this may result in cellular data charges as per their existing mobile wireless communications device data plan. Other options may be provided.

Figure 16:
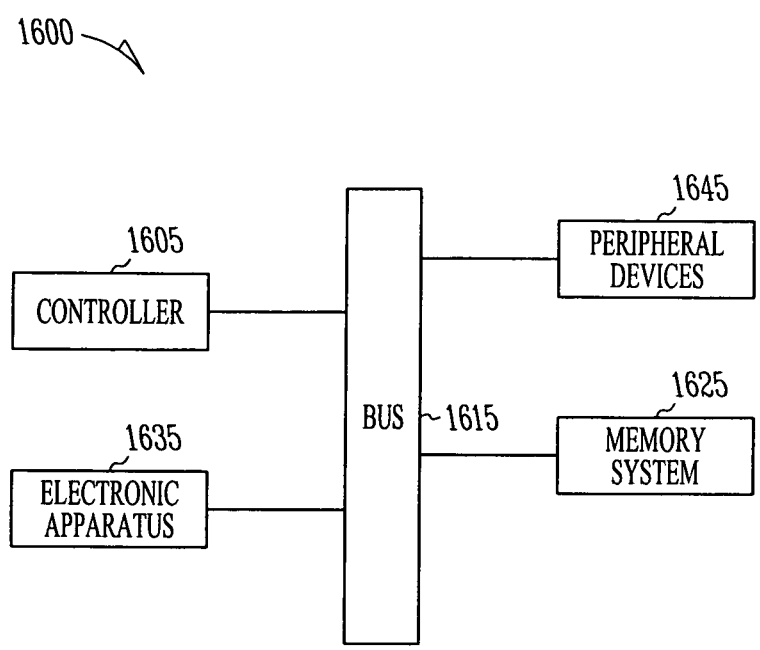
FIG. 16 depicts a diagram of an embodiment of a system having a controller and a memory system, according to various embodiments.

FIG. 16 depicts a diagram of an embodiment of a system 1600 having a controller 1605 and a memory system 1625. System 1600 also includes electronic apparatus 1635 and a bus 1615, where bus 1615 provides electrical conductivity among the components of system 1600. In an embodiment, bus 1615 includes an address bus, a data bus, and a control bus, each independently configured. In an alternative embodiment, bus 1615 uses common conductive lines for providing one or more of address, data, or control, the use of which is regulated by controller 1605. Bus 1615 may be realized as multiple busses. In an embodiment, electronic apparatus 1635 is additional memory system configured in a manner similar to memory system 1625. In an embodiment, additional peripheral device or devices 1645 are coupled to bus 1615. In an embodiment, peripheral devices 1645 include displays, additional storage memory system, and/or other control devices that may operate in conjunction with controller 1605 and/or memory system 1625. In an embodiment, controller 1605 is a processor.

Controller 1605 and memory system 1625 can be arranged to manage media content and associated information on system 1600. In an embodiment, system 1600 is arranged as a PC. The PC may include instrumentality distributed throughout the PC to operate as a wireless server. System 1600 arranged as a PC can operate according to any of the various embodiments discussed herein to manage media content and associated information within the PC and/or in conjunction with one or more mobile devices such as mobile wireless communications devices.

In an embodiment, system 1600 is arranged as a mobile device. The mobile device may be a mobile wireless communications device. System 1600 arranged as a mobile device can operate according to any of the various embodiments discussed herein to manage media content and associated information within the mobile device, and/or in conjunction with a PC or other apparatus having software and/or hardware to manage media content.

Various embodiments or combination of embodiments for apparatus and methods for a system, such as a PC, to manage media content, as described herein, can be realized in hardware implementations, software implementations, and combinations of hardware and software implementations. These implementations may include a machine-readable medium having machine-executable instructions, such as a computer-readable medium having computer-executable instructions, for operating the system in a relationship with one or more mobile devices such that media content and associated information is managed between the system and the mobile device. The communications of the system with a mobile wireless communications device can be conducted on a secured basis. The machine-readable medium is not limited to any one type of medium.

Various embodiments or combination of embodiments for apparatus and methods for a mobile device, such as a mobile wireless communications device, as described herein, can be realized in hardware implementations, software implementations, and combinations of hardware and software implementations. These implementations may include a machine-readable medium having machine-executable instructions, such as a computer-readable medium having computer-executable instructions, for operating the mobile device to manage its media content and associated information within the mobile device, in conjunction with a system, such as a PC, and/or with respect to other mobile devices. The communications between a mobile wireless communications device and the system can be conducted on a secured basis. The machine-readable medium is not limited to any one type of medium.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A non-transitory computer readable medium having computer executable instructions for executing a method of transferring media content, the method comprising:
    receiving at a first wireless server a request from a mobile wireless device to access available content from one or more media sources through the first wireless server;
    detecting, by a media synchronization engine of the first wireless server, media content already present on the mobile wireless device;
    determining, by the media synchronization engine of the first wireless server, that an origin of the media content is different than the first wireless server based on a source identifier among a plurality of source identifiers stored on the mobile wireless device and associated with the origin of the media content, wherein the media content is already present on the mobile wireless device, and the plurality of source identifiers comprise at least an identifier of the first wireless server and an identifier of a second wireless server; and
    protecting the media content already present on the mobile wireless device based on the origin of the media content being different than the first wireless server, including:
        determining, by the media synchronization engine of the first wireless server, if the media content already present on the mobile wireless device was transferred to the mobile wireless device by the first wireless server; and
        in response to the media synchronization engine of the first wireless server determining one or more collections of the media content already present on the mobile wireless device were transferred to the mobile wireless device by the second wireless server other than the first wireless server, maintaining the one or more collections of the media content already present on the mobile wireless device transferred by the second wireless server when a synchronization between the mobile wireless device and the first wireless server is performed, by the media synchronization engine of the first wireless server, to synchronize the media content already present on the mobile wireless device;
    wherein the synchronization modifies media content already present on the mobile wireless device transferred by the first wireless server.

2. The non-transitory computer readable medium of claim 1, the method further comprising transferring media content to the mobile wireless device by the media synchronization engine of the first wireless server.

3. A computerized method comprising:
    determining one or more actions to synchronize media content on a mobile wireless device, wherein the media content on the mobile wireless device includes first media content transferred to the mobile wireless device by a first wireless server and second media content transferred to the mobile wireless device by a second wireless server; and
    in response to determining the one or more actions to synchronize the media content on the mobile wireless device:
        detecting, by a media synchronization engine of the first wireless server, which of the media content on the mobile wireless device was transferred to the mobile wireless device by the first wireless server and which of the media content on the mobile wireless device was transferred to the mobile wireless device by the second wireless server different than the first wireless server, wherein the detection is based on a first source identifier and a second source identifier stored on the mobile wireless device, the first source identifier is associated with an origin of the first media content, the second source identifier is associated with an origin of the second media content, and the first source identifier is an identifier of the first wireless server or an identifier of the second wireless server; and
        synchronizing, by the media synchronization engine of the first wireless server, the media content on the mobile wireless device based on the origin of the first and second media content, including synchronizing the first media content transferred by the first wireless server on the mobile wireless device without modifying the second media content on the mobile wireless device transferred by the second wireless server.

4. The computerized method of claim 3 wherein synchronizing the media content comprises adding media content to the mobile wireless device.

5. The computerized method of claim 3 wherein synchronizing the media content comprises removing media content from the mobile wireless device.

6. The computerized method of claim 3 wherein the first media content transferred to the mobile wireless device by the first wireless server comprises media content from multiple sources accessed through the first wireless server.

7. The computerized method of claim 3 wherein synchronizing the media content is performed over a wireless connection.

8. A first wireless server, comprising:
    a processor;
    a machine accessible medium to store instructions, the instructions when executed by the processor cause the processor to perform operations comprising:
    detecting a connection between a mobile wireless device and the first wireless server;
    in response to detecting the connection between the mobile wireless device and the first wireless server, determining if media content already present on the mobile wireless device was transferred by a first synchronization engine of the first wireless server;

permitting the mobile wireless device to access available content from the first wireless server even if the media content already present on the mobile wireless device was transferred to the mobile wireless device by a second synchronization engine of a second wireless server other than the first wireless server;

determining, by the first synchronization engine of the first wireless server, that an origin of the media content already present on the mobile wireless device is different than the first wireless server based on a first source identifier and a second source identifier stored on the mobile wireless device, wherein the media content already present on the mobile wireless device includes first media content transferred to the mobile wireless device by the first synchronization engine of the first wireless server and second media content transferred to the mobile wireless device by the second synchronization engine of the second wireless server, the first source identifier is associated with an origin of the first media content, the second source identifier is associated with an origin of the second media content, and the first source identifier is an identifier of the first wireless server or an identifier of the second wireless server; and synchronizing the media content on the mobile wireless device based on the origin of the media content, including synchronizing the first media content on the mobile wireless device with at least some of the available content from the first wireless server without modifying the second media content already present on the mobile wireless device that was transferred to the mobile wireless device by the second synchronization engine of the second wireless server.

9. The first wireless server of claim 8 wherein the first wireless server is a personal computer.

10. A mobile wireless device comprising:

a processor;

a machine accessible medium to store instructions, the instructions when executed cause the processor to perform operations comprising:

receiving, at the mobile wireless device, a first library of media content from a first wireless server in a synchronization of media content with the first wireless server, wherein the first wireless server is different than the mobile wireless device;

associating the first library with the first wireless server;

receiving, at the mobile device, a second library of media content from a second wireless server in a synchronization of media content with the second wireless server, wherein the second library of media content is synchronized on the mobile wireless device without overwriting the first library of media content already present on the mobile wireless device based on a first source identifier stored on the mobile wireless device and a second source identifier, the first source identifier is associated with an origin of the first library of media content, the second source identifier is associated with an origin of the second library of media content, and the first source identifier is an identifier of the first wireless server or an identifier of the second wireless server;

associating, by a media synchronization engine of the first wireless server, the second library, received at the mobile device and from the second wireless server different than the first wireless server, with the second wireless server; and playing media content from both the first library and the second library on the mobile wireless device.

11. The mobile wireless device of claim 10 wherein the instructions to associate the first library with the first wireless server and to associate the second library with the second wireless server further comprise instructions to maintain the first source identifier for the first wireless server and to maintain the second source identifier for the second wireless server on the mobile wireless device.

12. The mobile wireless device of claim 10 wherein the instructions to associate the first library with the first wireless server and to associate the second library with the second wireless server further comprise storing media content from the first library in a first data structure on the mobile wireless device and storing media content from the second library in a second data structure on the mobile wireless device.

13. The mobile wireless device of claim 12 wherein the first data structure and the second data structure are folders.

14. The mobile wireless device of claim 10 wherein the instructions to associate the first library with the first wireless server and to associate the second library with the second wireless server further comprise instructions to store one or more settings files identifying the media content from the first library and the media content from the second library.

15. The mobile wireless device of claim 10, the operations further comprising storing the media content from the first library and the second library together on the mobile wireless device.

* * * * *